United States Patent [19]

Witenhafer et al.

[11] 4,062,925
[45] Dec. 13, 1977

[54] OXIDATION OF VINYLIDENE HALIDES BY PERMANGANATES IN GASEOUS OR AQUEOUS PROCESS STREAMS

[75] Inventors: Donald Edward Witenhafer, North Olmsted; Charles Anthony Daniels; Ralph Francis Koebel, both of Avon Lake, all of Ohio

[73] Assignee: The B. F. Goodrich Company, Akron, Ohio

[21] Appl. No.: 651,184

[22] Filed: Jan. 21, 1976

[51] Int. Cl.² .................................................. B01D 53/34
[52] U.S. Cl. ........................................ 423/240; 423/245; 423/481; 423/605; 260/542

[58] Field of Search ............... 423/210, 224, 245, 240, 423/241, 605, 481, 224; 21/53, 55, 58; 210/63, 632; 260/542

[56] References Cited

U.S. PATENT DOCUMENTS

| | | | |
|---|---|---|---|
| 3,933,980 | 1/1976 | Smalheiser | 423/245 |
| 3,966,440 | 6/1976 | Roberts | 55/274 |
| 3,969,479 | 7/1976 | Lonnes et al. | 423/224 |

*Primary Examiner*—Earl C. Thomas
*Attorney, Agent, or Firm*—Charles A. Crehore

[57] ABSTRACT

Vinylidene halides in gaseous or aqueous process streams may be oxidized effectively by contacting them with permanganic acid, at least one alkali metal permanganate, at least one alkaline earth metal permanganate, or a mixture thereof.

8 Claims, No Drawings

OXIDATION OF VINYLIDENE HALIDES BY PERMANGANATES IN GASEOUS OR AQUEOUS PROCESS STREAMS

BACKGROUND OF THE INVENTION

It has been found desirable to treat gas and waste water from vinylidene halide polymerization processes in order to reduce and preferably to eliminate release of vinylidene halide monomers to the environment. Use of carbon black for absorption of residual vinylidene halide monomers may require expensive handling and regeneration of the carbon black. A new, simple process is desired for destroying residual vinylidene halide monomers in gas and waste water process streams without producing dangerous by-products.

SUMMARY OF THE INVENTION

Vinylidene halides in gaseous or aqueous process streams may be oxidized effectively to an amount less than about 10 parts per million by weight of gas or water. Rapid oxidation is achieved by contacting at least one vinylidene halide in a gaseous or aqueous process stream with at least one permanganate in a molar ratio of permanganate to vinylidene halide from about 1/1 to about 10/1 or more. The permanganate may be permanganic acid, at least one alkali metal permanganate, at least one alkaline earth metal permanganate, or a mixture thereof. The vinylidene halide has the formula

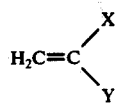

wherein X is chlorine, bromine or fluorine, and Y is hydrogen, chlorine, bromine or fluorine.

DETAILED DESCRIPTION

Vinylidene halides may be removed almost quantitatively from gaseous or aqueous streams by the process of this invention, i.e., vinylidene halides may be oxidized to less than 10 parts per million (PPM) and generally to less than 1 PPM by weight of gas or water. At least one vinylidene halide in a gaseous or aqueous process stream, generally a waste stream, is oxidized effectively by contacting it with at least one permanganate. The amount of vinylidene halide in the gaseous or aqueous stream may range from about 0.1 to 10,000 parts or more per million parts (PPM) by weight of gas or water but is typically from about 50 to about 1000 PPM. A suitable molar ratio of permanganate to vinylidene halide may range from about 1/1 to about 10/1 or more, preferably from about 1.5/1 to about 5/1, and more preferably from about 2/1 to about 3.5/1. Excellent results were obtained at about a 3/1 to 3.5/1 molar ratio of permanganate to vinylidene halide. The latter range encompasses the 3.3/1 theoretical minimum molar ratio required for stoichiometrically complete oxidation of vinylidene halide by permanganates.

Vinylidene halides oxidizable by the process of this invention have the formula

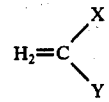

wherein X is chlorine, bromine or fluorine, and Y is hydrogen, chlorine, bromine or fluorine. More preferably, X is chlorine and Y is hydrogen or chlorine. Suitable vinylidene halides include vinyl chloride, vinyl bromide, vinylidene chloride and the like. Excellent results were obtained using vinyl chloride.

Permanganates suitable for use in the process of this invention include permanganic acid; alkali metal permanganates such as lithium permanganate, sodium permanganate, potassium permanganate and the like; and alkaline earth metal permanganates such as calcium permanganate, magnesium permanganate and the like. Excellent results were obtained using potassium permanganate ($KMnO_4$).

Permanganates may be contacted in either solution or dry form with aqueous streams containing vinylidene halides. Alternatively, permanganates may be contacted in solution form with gaseous streams containing vinylidene halides. Suitable gaseous streams include air, nitrogen and the like. An aqueous permanganate solution typically contains from about 0.001 to about 10 wt.% or more, more preferably from about 0.01 to about 1 wt.%, of permanganate based upon total solution weight. Contacting may be done at any pH, preferably from about 2 to about 12, more preferably from about 8 to about 11. Reaction products may vary according to the pH used. For example, formic acid, $CO_2$, HCl and $MnO_2$ may be produced at pH 7, while $CO_2$, HCl and $MnO_2$ may be produced at pH 10. Formic acid production is desirably minimized, and the higher pH range recited is therefore preferred. Contacting typically is performed at temperatures from about 0° C. to about 100° C., but temperatures may be lower than 0° C. if brine process streams or the like are used, and higher than 100° C. if, for example, steam or pressurized aqueous streams are used. Pressure during contacting is generally atmospheric, but sub-atmospheric and super-atmospheric pressures may also be used.

Any conventional contacting technique may be used for mixing gas with permanganate solutions, or for mixing aqueous streams with permanganate or solutions thereof. For example, a permanganate solution may be metered using a rotometer or the like into a pipeline stream containing water and vinylidene halides, with mixing conducted in the pipeline. Alternatively, an aqueous stream containing vinylidene halides may be mixed with permanganate or a solution thereof using a tank, vat or the like equipped with paddle stirrers or the like. Gas streams may be scrubbed or vinylidene halides using permanganate solutions in wet scrubbers known to the art such as packed towers, tray columns, spray columns, wetted wall columns or the like.

The following examples illustrate the present invention more fully.

EXAMPLE 1

A 1-liter beaker equipped with a magnetic stirrer was used to prepare the following solution:

600 grams distilled water
10 grams $KMnO_4$

| -continued |
|---|
| 10 grams 5% aqueous NaOH |
| 620 grams TOTAL. |

The solution was deep purple in color. Vinyl chloride gas was bubbled slowly into the solution with stirring. In less than about 12 minutes the solution turned substantially brown. The solution was allowed to stand overnight, and a brown precipitate of MnO$_2$ formed. The supernatant liquid after precipitation was clear, indicating complete consumption of the potassium permanganate.

Silver nitrate was mixed with a portion of the clear supernatant liquid. A white precipitate of AgCl formed, indicating that one of the products of vinyl chloride oxidation was the chloride ion. EXAMPLE 2

Vinyl chloride gas was bubbled through distilled water at about 22° C. for about 10 to 12 minutes to form a solution. About 50 ml of the solution was transferred to a flexible polyethylene bottle. The bottle was capped with a septum suitable for syringe injection and sampling, with no head space being left in the bottle.

A 0.1 molar KMnO$_4$ solution in distilled water was prepared and adjusted to pH 10 using aqueous KOH. Successive small amounts of the KMnO$_4$ solution were injected into the vinyl chloride solution, with several minutes being allowed after each injection as a reaction period. Before beginning injections and also after each reaction period, a small sample was withdrawn from the bottle. Each sample was analyzed quantitatively for vinyl chloride using gas chromatography, and for chloride ion content using a chloride ion electrode. Test results are summarized in TABLE I.

TABLE I

| Addition Number | Vinyl Chloride Content before KMnO$_4$ Addition | | KMnO$_4$ Added | Vinyl Chloride Content after KMnO$_4$ Addition | | Chloride Ion Content after KMnO$_4$ Addition |
|---|---|---|---|---|---|---|
| | Mmoles | PPM | Mmoles | Mmoles | PPM | (Mmoles) |
| 1 | 0.408 | 510 | 0.270 | 0.182 | 227 | 0.200 |
| 2 | 0.182 | 227 | 0.258 | 0.041 | 51 | 0.364 |
| 3 | 0.041 | 51 | 0.250 | 0.0105 | 13 | 0.400 |
| 4 | 0.0105 | 13 | 0.250 | 0.0005 | 1 | — |
| 5 | 0.0008 | 1 | 0.260 | 0.0002 | 0.25 | — |

The data in Table I demonstrates that at about 22° C. potassium permanganate almost completely destroys vinyl chloride, lowering the vinyl chloride level from 510 PPM to only 0.25 PPM. The overall molar ratio used of permanganate to vinyl chloride was about 3.15/1, which was slightly less than the approximate 3.33/1 ratio theoretically required for total vinyl chloride destruction.

EXAMPLES 3-4

A 250 ml beaker was equipped with a magnetic stirrer and filled partially with about 150 ml of distilled water at about 22° C. Vinyl chloride gas was bubbled slowly into the water for about 5 minutes with stirring. 0.25 cc of a 0.1 molar aqueous KMnO$_4$ solution was added to the beaker with stirring. In only about 5 seconds the solution color changed from purple to light orange or brown, indicating rapid destruction of vinyl chloride.

The above example was repeated with the beaker and contents being chilled to about 6° C. before KMnO$_4$ addition. In only about 5 seconds the solution color changed from purple to light orange, indicating rapid destruction of vinyl chloride even at a low temperature.

The process of this invention is useful for rapid, substantially complete destruction of residual vinylidene halide monomers in gas and water waste process streams without production of dangerous by-products.

We claim:

1. A process for oxidizing vinylidene halides in a gaseous or aqueous stream, comprising contacting at least one permanganate with at least one vinylidene halide in said stream, the permanganate being permanganic acid, at least one alkali metal permanganate, at least one alkaline earth metal permanganate or a mixture thereof, and the vinylidene halide having the formula

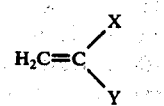

wherein X is chlorine, bromine or fluorine, and Y is hydrogen, chlorine, bromine or fluorine.

2. A process of claim 1 wherein the permanganate is at least one alkali metal permanganate.

3. A process of claim 2 wherein X is chlorine and Y is hydrogen or chlorine.

4. A process of claim 3 wherein the molar ratio of permanganate to vinylidene halide is from about 1/1 to about 10/1.

5. A process of claim 4 wherein contacting is performed at a pH from about 2 to about 12.

6. A process of claim 5 wherein contacting is performed at a temperature from about 0° C. to about 100° C.

7. A process of claim 2 wherein said alkali metal permanganate is potassium permanganate.

8. A process of claim 3 wherein said vinylidene halide is vinyl chloride.

* * * * *